US012048907B1

(12) United States Patent
Tsuchiya (10) Patent No.: US 12,048,907 B1
(45) Date of Patent: Jul. 30, 2024

(54) FINE BUBBLE GENERATOR

(71) Applicant: ARAKAWA INDUSTRY CO., LTD., Nisshin (JP)

(72) Inventor: Yukihisa Tsuchiya, Nisshin (JP)

(73) Assignee: ARAKAWA INDUSTRY CO., LTD., Nisshin (JP)

( * ) Notice: Subject to any disclaimer, the term of this patent is extended or adjusted under 35 U.S.C. 154(b) by 0 days.

(21) Appl. No.: 18/561,106

(22) PCT Filed: Mar. 14, 2022

(86) PCT No.: PCT/JP2022/011300
§ 371 (c)(1),
(2) Date: Nov. 15, 2023

(87) PCT Pub. No.: WO2022/264568
PCT Pub. Date: Dec. 22, 2022

(30) Foreign Application Priority Data

Jun. 15, 2021 (JP) .................................. 2021-099346

(51) Int. Cl.
*B01F 23/23* (2022.01)
*B01F 23/232* (2022.01)
*B01F 23/2375* (2022.01)
*B01F 25/441* (2022.01)

(52) U.S. Cl.
CPC ...... *B01F 25/44163* (2022.01); *B01F 23/232* (2022.01); *B01F 23/2375* (2022.01)

(58) Field of Classification Search
CPC ............. B01F 25/44163; B01F 23/232; B01F 23/2375
See application file for complete search history.

(56) References Cited

FOREIGN PATENT DOCUMENTS

| CN | 109382013 A | 2/2019 |
|----|-------------|--------|
| JP | 2003181258 A | 7/2003 |
| JP | 2010240592 A | 10/2010 |
| JP | 2016195988 A | 11/2016 |
| JP | 2023147980 A | * 10/2023 |

(Continued)

OTHER PUBLICATIONS

International Search Report issued in corresponding International Application No. PCT/JP2022/011300, dated May 24, 2022, pp. 1-7, Japan Patent Office, Tokyo, Japan.

(Continued)

*Primary Examiner* — Robert A Hopkins
(74) *Attorney, Agent, or Firm* — HAUPTMAN HAM, LLP (57) ABSTRACT

A fine bubble generator for generating fine bubbles in a liquid without externally introducing gas. According to an embodiment, a liquid flows in a gap between a first helical part on an inner surface of an outer member having a tubular shape and a second helical part on an outer surface of an inner member in the outer member, so that cavitation occurs because of the decrease in pressure when the liquid flows out of the gap between the first helical part and the second helical part, and fine bubbles are generated in the liquid. In this process, the liquid flowing near the inner surface of the outer member swirls along the first helical part, and the liquid flowing near the outer surface of the inner member swirls along the second helical part, and cavitation is promoted by the swirl flows, and the amount of fine bubbles generated is increased.

7 Claims, 9 Drawing Sheets

(56) References Cited

FOREIGN PATENT DOCUMENTS

| | | |
|---|---|---|
| KR | 100938899 B1 | 1/2010 |
| KR | 101370229 B1 | 3/2014 |
| KR | 20170104351 A | 9/2017 |
| WO | 2018117040 A1 | 6/2018 |

OTHER PUBLICATIONS

Written Opinion issued in corresponding International Application No. PCT/JP2022/011300, dated May 24, 2022, pp. 1-5, Japan Patent Office, Tokyo, Japan.
Chinese Office Action issued in corresponding Chinese Application No. 202280035884.7, dated Apr. 11, 2024, pp. 1-5.

* cited by examiner

| | INNER MEMBER | | | | DISCHARGE AMOUNT [L/min] | FLOW CHANNEL AREA [mm²] | AVERAGE PARTICLE DIAMETER [nm] | MODAL DIAMETER [nm] | PARTICLE NUMBER CONCENTRATION [Number/ml] |
|---|---|---|---|---|---|---|---|---|---|
| | HELIX DIRECTION | OUTER DIAMETER [mm] | LENGTH [mm] | DISTANCE [mm] | | | | | |
| ONLY COUPLING | — | — | — | — | 18 | 176.71 | 93.8 | 74.0 | $2.33 \times 10^7$ |
| EX. 1 | RIGHT | 10.0 | 8.0 | 0.25 | 4.5 | 9.82 | 65.2 | 64.2 | $5.75 \times 10^7$ |
| EX. 2 | RIGHT | 10.0 | 12.0 | 0.25 | 4.5 | 9.82 | 109.5 | 69.4 | $8.61 \times 10^7$ |
| EX. 3 | LEFT | 10.0 | 8.0 | 0.25 | 4.5 | 9.82 | 105.2 | 87.5 | $7.33 \times 10^7$ |
| EX. 4 | LEFT | 10.0 | 12.0 | 0.25 | 4.5 | 9.82 | 95.7 | 81.8 | $9.56 \times 10^7$ |
| EX. 5 | LEFT | 9.5 | 8.0 | 0.5 | 8.0 | 17.48 | 102.5 | 89.2 | $6.56 \times 10^7$ |
| EX. 6 | LEFT | 9.5 | 12.0 | 0.5 | 8.0 | 17.48 | 125.2 | 89.1 | $5.92 \times 10^7$ |
| EX. 7 | LEFT | 9.0 | 8.0 | 0.75 | 9.2 | 24.74 | 121.1 | 111.4 | $5.24 \times 10^7$ |
| EX. 8 | LEFT | 9.0 | 12.0 | 0.75 | 9.2 | 24.74 | 93.1 | 89.9 | $6.89 \times 10^7$ |
| EX. 9 | LEFT | 8.5 | 8.0 | 1.0 | 12.3 | 31.61 | 107.0 | 86.6 | $8.52 \times 10^7$ |
| EX. 10 | LEFT | 8.5 | 12.0 | 1.0 | 12.3 | 31.61 | 108.1 | 80.1 | $1.37 \times 10^8$ |

Fig. 9

FINE BUBBLE GENERATOR

The present application is a U.S. National Phase of International Application Number PCT/JP2022/011300, filed Mar. 14, 2022, which claims priority to Japanese Application No. 2021-099346, filed Jun. 15, 2021.

TECHNICAL FIELD

The present invention relates to a fine bubble generator that generates a fine bubble in a liquid flowing in a flow channel for tap water, industrial water or the like, for example.

BACKGROUND ART

In recent years, fine bubbles contained in liquid, such as the so-called microbubbles or ultra fine bubbles, have been gaining attention, and becoming commercially practical in various fields, such as various types of cleaning, clarification, fishing industry, agriculture, medicine, cosmetology and food processing. In the industrial application, for example, fine bubbles are used for cleaning of precision machinery components, prevention of adhesion of foreign matter in piping, and water quality improvement and deodorization of waterworks and sewerage, lakes or the like. In the cosmetology and health-care applications, fine bubbles are known to be effective for warm bath, skin cleaning or the like.

In general, bubbles having a diameter equal to or greater than 1 μm and equal to or smaller than 100 μm are referred to as microbubbles, and bubbles having a diameter smaller than 1 μm are referred to as ultra fine bubbles. In particular, ultra fine bubbles, which are extremely fine, hardly floats up and remain in the liquid for a long time (several weeks to several months). Therefore, ultra fine bubbles are expected to be highly effective in their applications.

As known devices that generate such fine bubbles, there are devices that generate fine bubbles in a liquid by externally introducing gas into a liquid passage part provided in a flow channel and mixing the gas with the liquid flowing in the flow channel (see Patent Literatures 1, 2 or 3).

CITATION LIST

Patent Literature

Patent Literature 1: Japanese Patent Publication 2008-119623
Patent Literature 2: Japanese Patent Publication 2008-229516
Patent Literature 3: Japanese Patent Publication 2014-121689

SUMMARY OF INVENTION

Technical Problem

However, the devices that externally introduce gas into the liquid, such as those in the prior art examples described above, have a problem that equipment such as a compressor for supplying gas is required and the structure is complicated. In addition, in order to externally introduce gas into the liquid, the pressure of the liquid typically needs to be lower than the pressure of the gas. Therefore, such devices also have a problem that it is difficult to generate fine bubbles because of the limit of the pressure of the introduced gas when the pressure of the liquid is high.

The present invention has been devised in view of the problems described above, and an object of the present invention is to provide a fine bubble generator that can generate fine bubbles in a liquid without externally introducing gas.

Solution to Problem

To attain the object described above, the present invention provides a fine bubble generator that is provided in a flow channel in which a liquid flows and generates a bubble in the liquid flowing in the flow channel, including: an outer member having a tubular shape in which the liquid flows in an axial direction, a first helical part helically extending in a circumferential direction being formed on an inner surface of the outer member; and an inner member arranged in the outer member with an outer surface thereof facing the inner surface of the outer member at a predetermined distance, a second helical part helically extending in the circumferential direction being formed on the outer surface of the inner member, wherein the liquid flows between the first helical part of the outer member and the second helical part of the inner member.

With this configuration, the liquid flows in the gap between the first helical part of the outer member and the second helical part of the inner member, cavitation occurs because of the decrease in pressure when the liquid flows out of the gap between the first helical part and the second helical part, and fine bubbles are generated in the liquid. In this process, the liquid flowing near the inner surface of the outer member swirls along the first helical part, and the liquid flowing near the outer surface of the inner member swirls along the second helical part, and the cavitation is promoted by the swirl flows. Therefore, fine bubbles can be generated in the liquid without introducing air with an external compressor or the like.

Advantageous Effects of Invention

According to the present invention, fine bubbles can be generated in the liquid without introducing air with an external compressor or the like, so that the structure can be simplified, and the fine bubble generator can be widely used in industrial and domestic applications. In addition, since the cavitation can be promoted by the swirl flow, the amount of fine bubbles generated can be increased.

DESCRIPTION OF EMBODIMENTS

FIGS. 1 to 9 show a fine bubble generator that generates fine bubbles in a liquid flowing in a flow channel according to an embodiment of the present invention.

Figure 1:
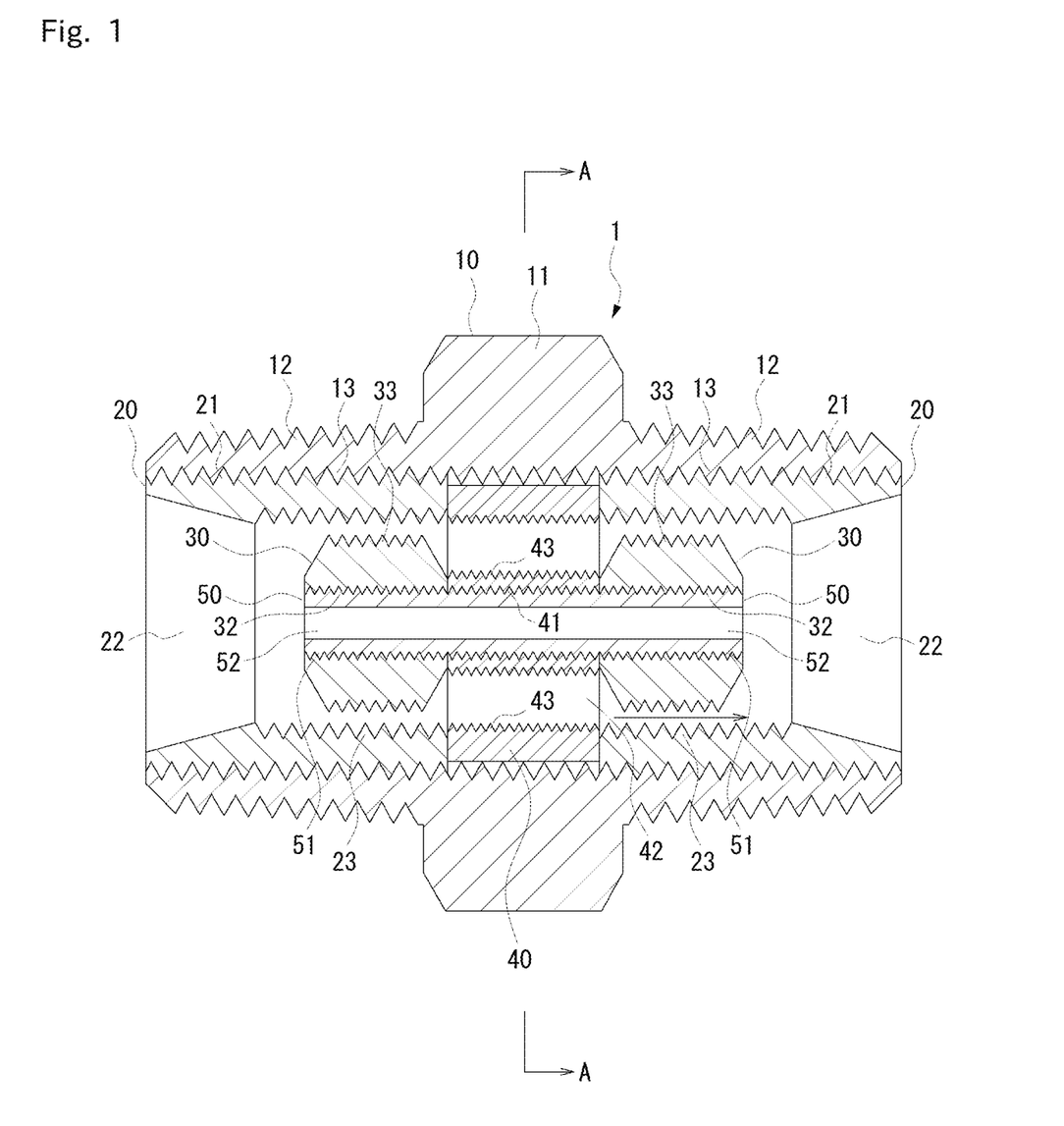
FIG. 1 is a side cross-sectional view of a fine bubble generator according to an embodiment of the present invention.
Figure 5:
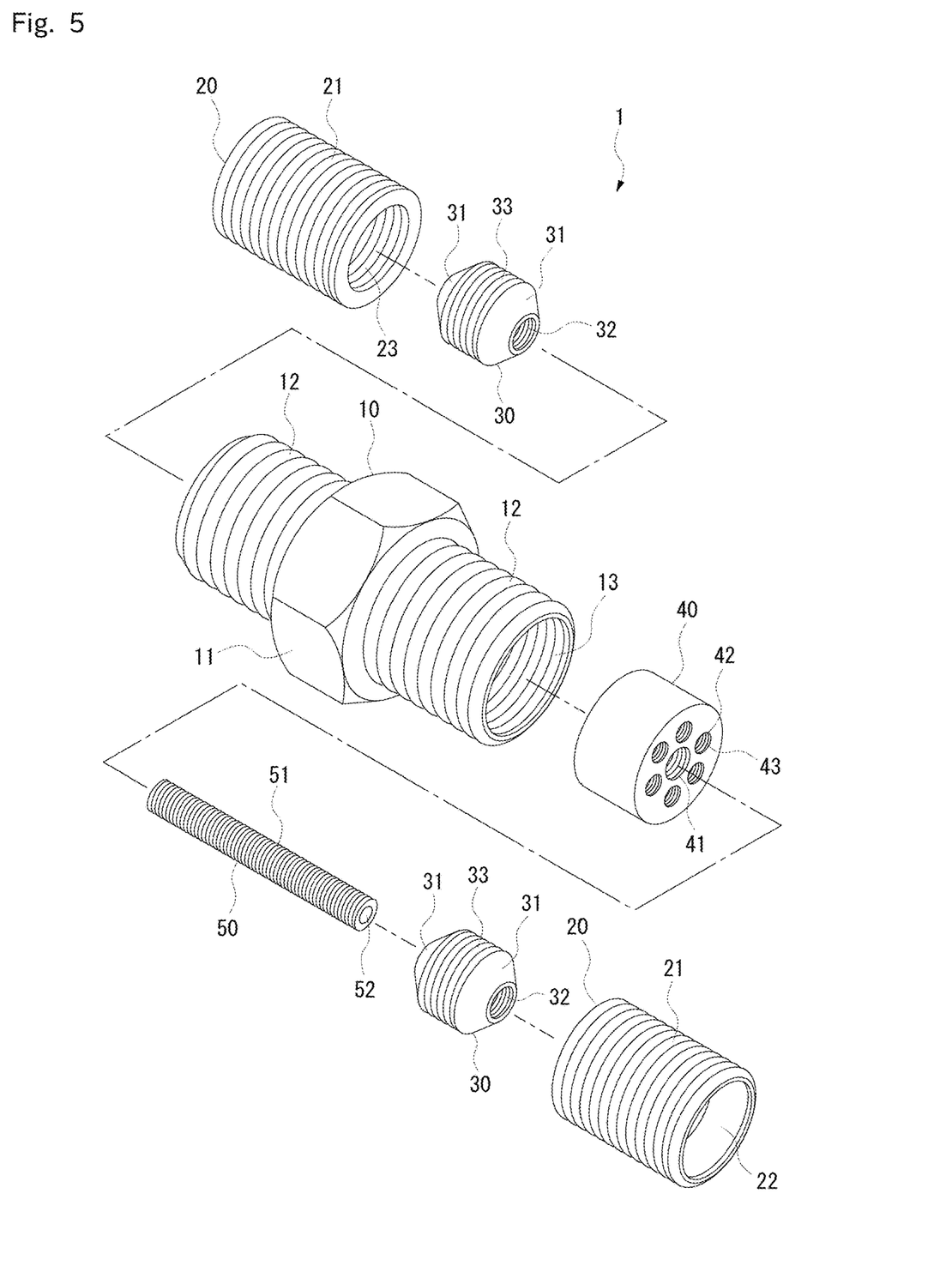
FIG. 5 is an exploded perspective view of the fine bubble generator.
Figure 6:
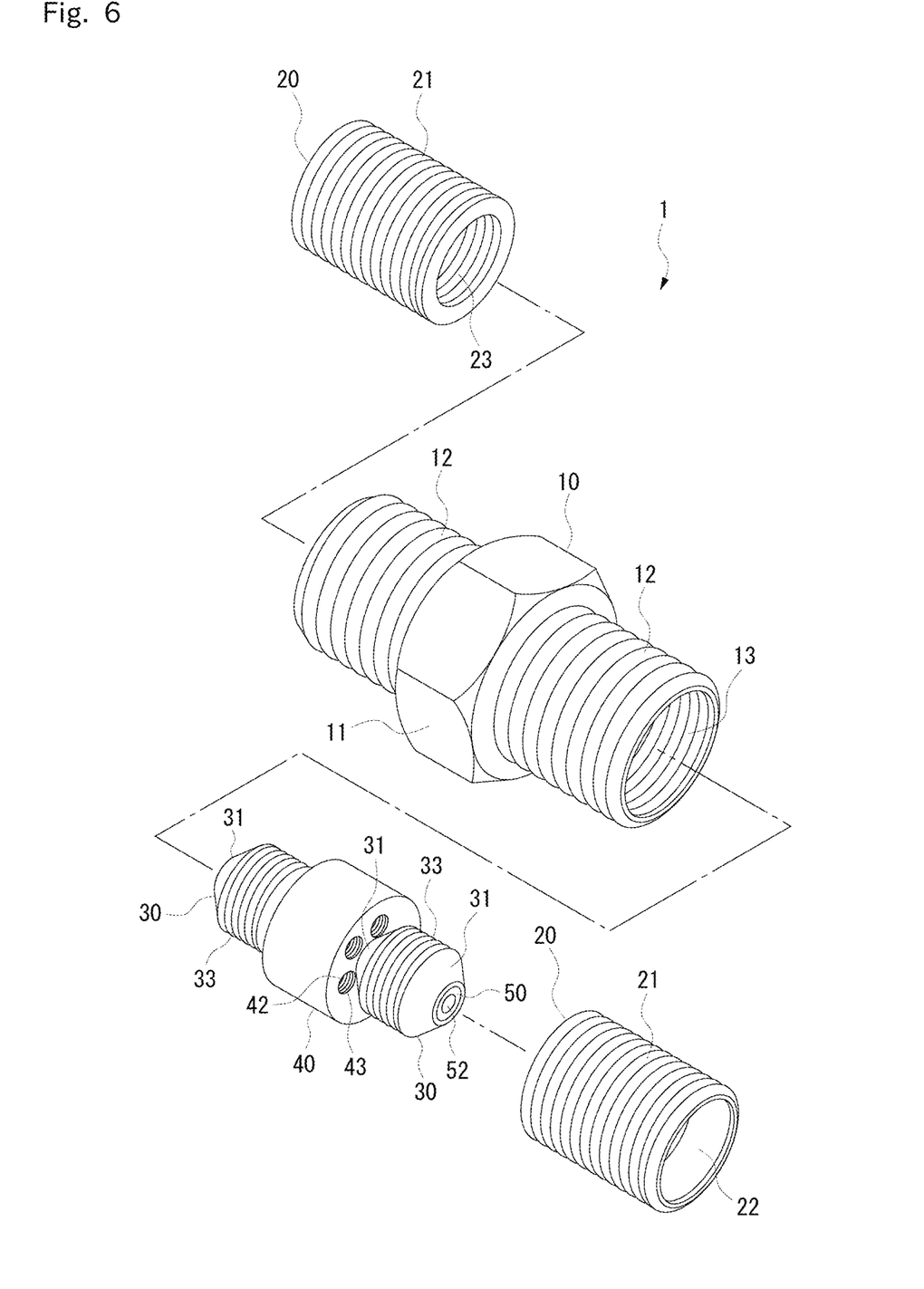
FIG. 6 is an exploded perspective view showing an assembly process for the fine bubble generator.

A fine bubble generator 1 according to this embodiment includes a main unit case 10 for flowing a liquid therein, a pair of outer members 20 disposed in an axial direction that are arranged in the main unit case 10, a pair of inner members 30 disposed in the axial direction each of which is arranged in one outer member 20, a middle member 40 arranged between the outer member 20 and inner member 30 on one side and the outer member 20 and inner member 30 on the other side, and a fixture member 50 that fixes the inner members 30 to the middle member 40.

The main unit case 10 is a member having the shape of a circular tube with openings at both axial ends, and has a hexagonal nut part 11 for grasping with a tool formed on the outer surface thereof at the middle in the axial direction thereof. Outer threaded parts 12 to be screwed with a piping component, such as a coupling, are provided on the outer surface of the main unit case 10. One of the outer threaded parts 12 is formed between one axial end of the main unit case 10 and the hexagonal nut part 11, and the other outer threaded part 12 is formed between the other axial end of the main unit case 10 and the hexagonal nut part 11. An inner threaded part 13 to be screwed with the outer members 20 is provided on the inner surface of the main unit case 10. The inner threaded part 13 is formed between one axial end of the main unit case 10 to the other axial end.

Figure 2:
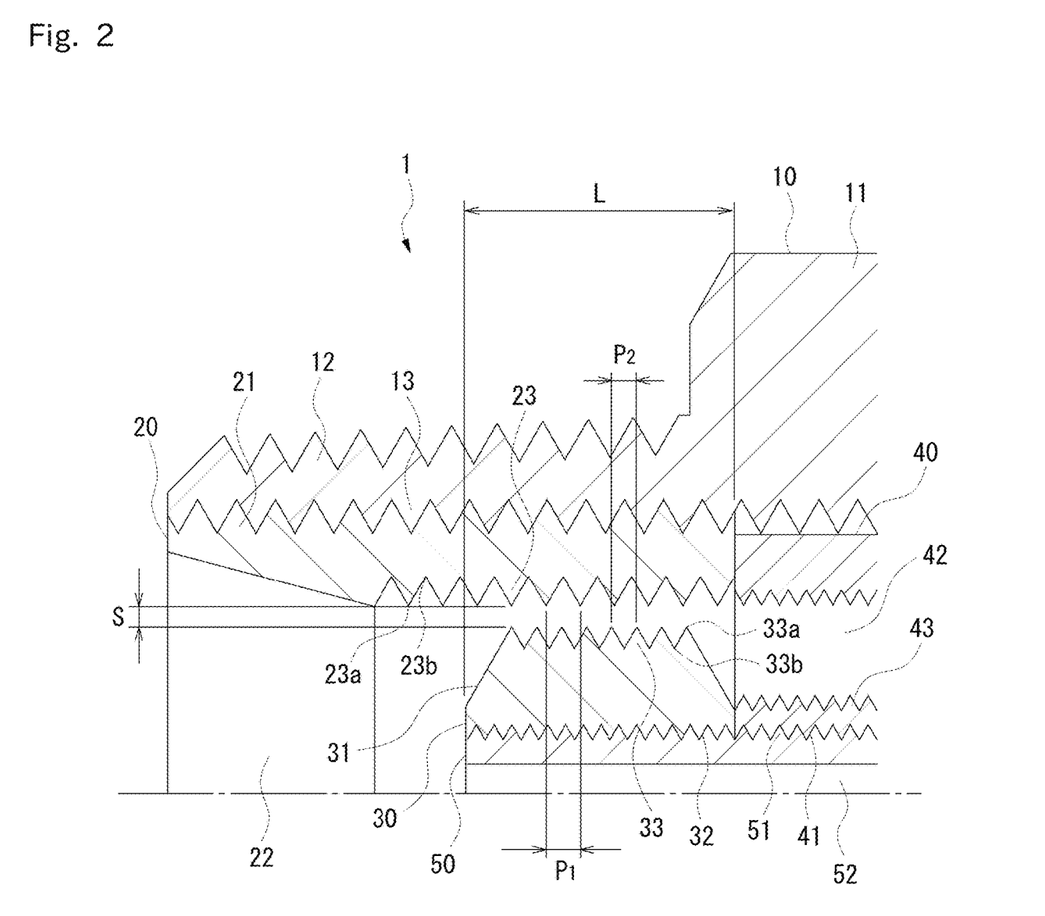
FIG. 2 is an enlarged cross-sectional view of essential parts of the fine bubble generator.
Figure 3:
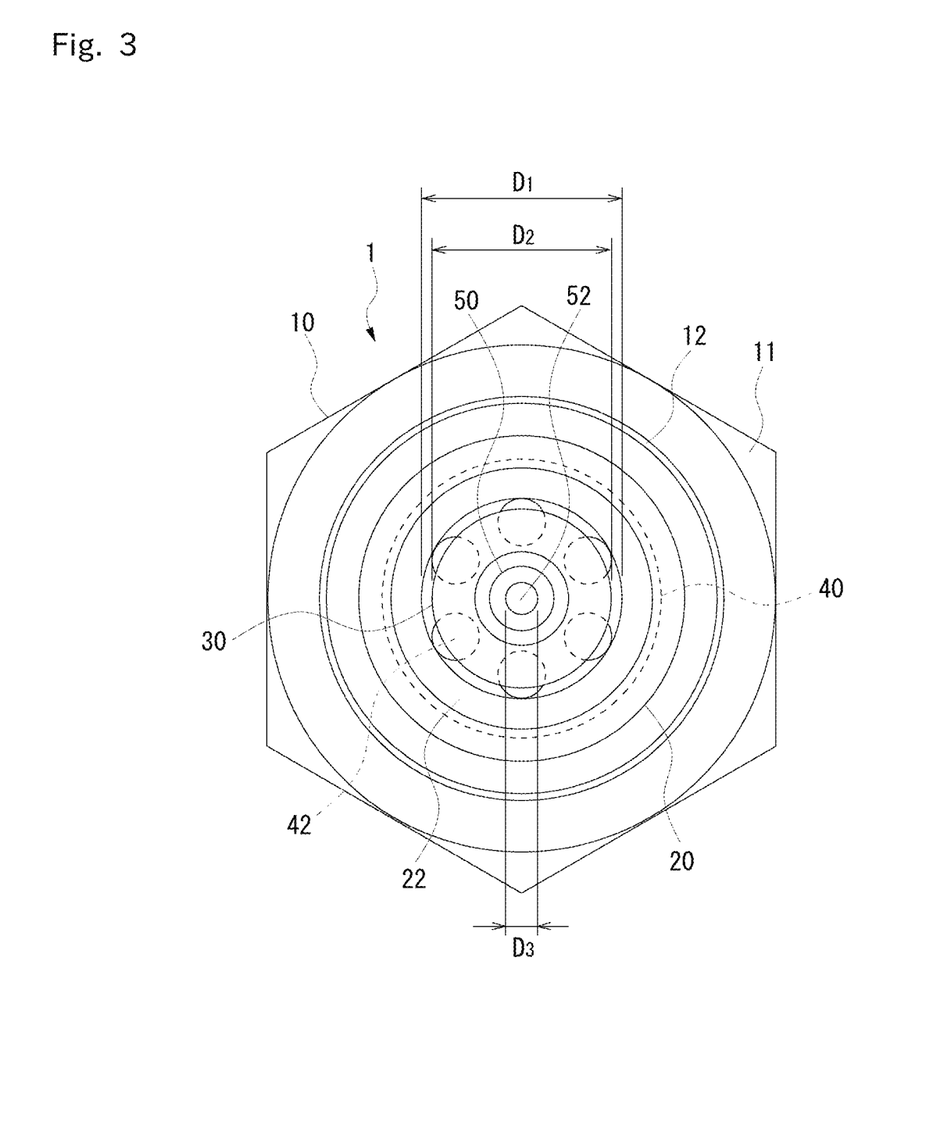
FIG. 3 is a front view of the fine bubble generator.
Figure 4:
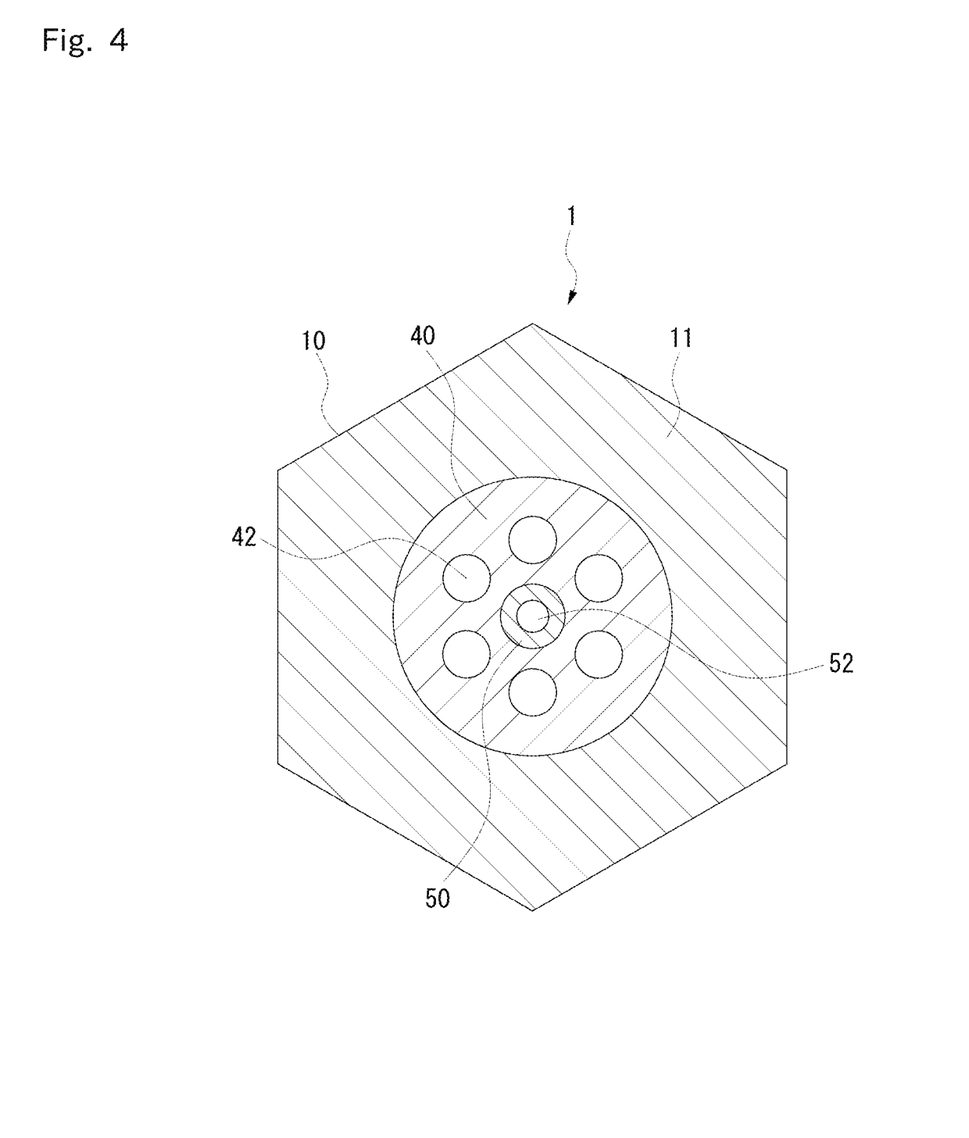
FIG. 4 is a cross-sectional view of the fine bubble generator taken along the arrow A-A.

The outer member 20 is a member having the shape of a circular tube with openings at both axial ends, and has an outer threaded part 21 to be screwed with the inner threaded part 13 of the main unit case 10 formed on the outer surface thereof between one axial end and the other axial end thereof. The outer member 20 has a tapered part 22 formed on the inner surface thereof at one axial end thereof, and the tapered part 22 is formed so that the bore of the outer member 20 gradually increases from the inner side to the outer side in the axial direction. The outer member 20 further has a first helical part 23 formed on the inner surface thereof, and the first helical part 23 is formed on the inner surface of the outer member 20 between the other axial end and the tapered part 22. The first helical part 23 is formed by an inside thread formed on the inner surface of the outer member 20, and is formed by a thread crest part 23a and a thread root part 23b that continuously extend helically in a circumferential direction on the outer member 20.

The inner member 30 is a member having the shape of a circular column and is arranged in the outer member 20 with the outer surface thereof facing the inner surface of the outer member 20 at a predetermined distance. The inner member 30 has tapered parts 31 at both axial ends thereof, and the tapered part 31 is formed so that the radially central part thereof protrudes outward in the axial direction. A threaded hole 32 penetrating the inner member 30 in the axial direction is provided at the center of the inner member 30 in the radial direction, and the fixture member 50 is screwed into the threaded hole 32. The inner member 30 has a second helical part 33 formed on the outer surface thereof, and the second helical part 33 is formed on the outer surface of the inner member 30 between one axial end and the other axial end of the inner member 30. The second helical part 33 is formed by an outside thread formed on the outer surface of the inner member 30, and is formed by a thread crest part 33a and a thread root part 33b that continuously extend helically in the circumferential direction on the inner member 30. In this case, the outer member 20 and the inner member 30 are formed so that a pitch P1 of the first helical part 23 and a pitch P2 of the second helical part are different from each other. In this embodiment, the pitch P1 of the first helical part 23 is greater than the pitch P2 of the second helical part 33.

The middle member 40 is a member having the shape of a circular column that is short in the axial direction, and is formed so that the outer diameter of the middle member 40 is equal to the inner diameter of the inner threaded part 13 of the main unit case 10. A threaded hole 41 penetrating the middle member 40 in the axial direction is provided at the center of the middle member 40 in the radial direction, and the fixture member 50 is screwed into the threaded hole 41. A plurality of through-holes 42 penetrating the middle member 40 in the axial direction are also provided, and the through-holes 42 are arranged around the threaded hole 41 at regular intervals in the circumferential direction of the middle member 40. Each through-hole 42 has a third helical part 43 formed on the inner surface thereof, and the third helical part 43 is formed on the inner surface of the through-hole 42 between one axial end and the other axial end thereof. The third helical part 43 is formed by an inside thread formed on the inner surface of the through-hole 42, and is formed by a thread crest part and a thread root part that continuously extend helically in the circumferential direction of the through-hole 42.

The fixture member 50 is a member having the shape of a circular column that is long in the axial direction, and has an outer threaded part 51, which is to be screwed with the threaded hole 41 of the middle member 40, formed on the outer surface thereof between one axial end and the other axial end thereof. The fixture member 50 is formed to have enough length that the fixture member 50 can be inserted in the inner members 30 and the middle member 40, and a liquid passage hole 52 penetrating the fixture member 50 in the axial direction is provided at the center of the fixture member 50 in the radial direction.

In assembly of the fine bubble generator 1 configured as described above, as shown in FIG. 6, the middle member 40 is first screwed onto the fixture member 50 until the middle member 40 is located at the middle of the fixture member 50 in the axial direction, and the inner members 30 are screwed onto both axial end parts of the fixture member 50 so that the middle member 40 supports the inner members 30. The assembly of the inner members 30, the middle member 40 and the fixture member 50 is then arranged in the main unit case 10 at the middle thereof in the axial direction, and the outer members 20 are then screwed into both axial end parts of the main unit case 10. In this process, the outer members 20 fasten the middle member 40 from both sides in the axial direction, so that the assembly of the inner members 30, the middle member 40 and the fixture member 50 is fixed in the main unit case 10 with reliability.

Figure 7:
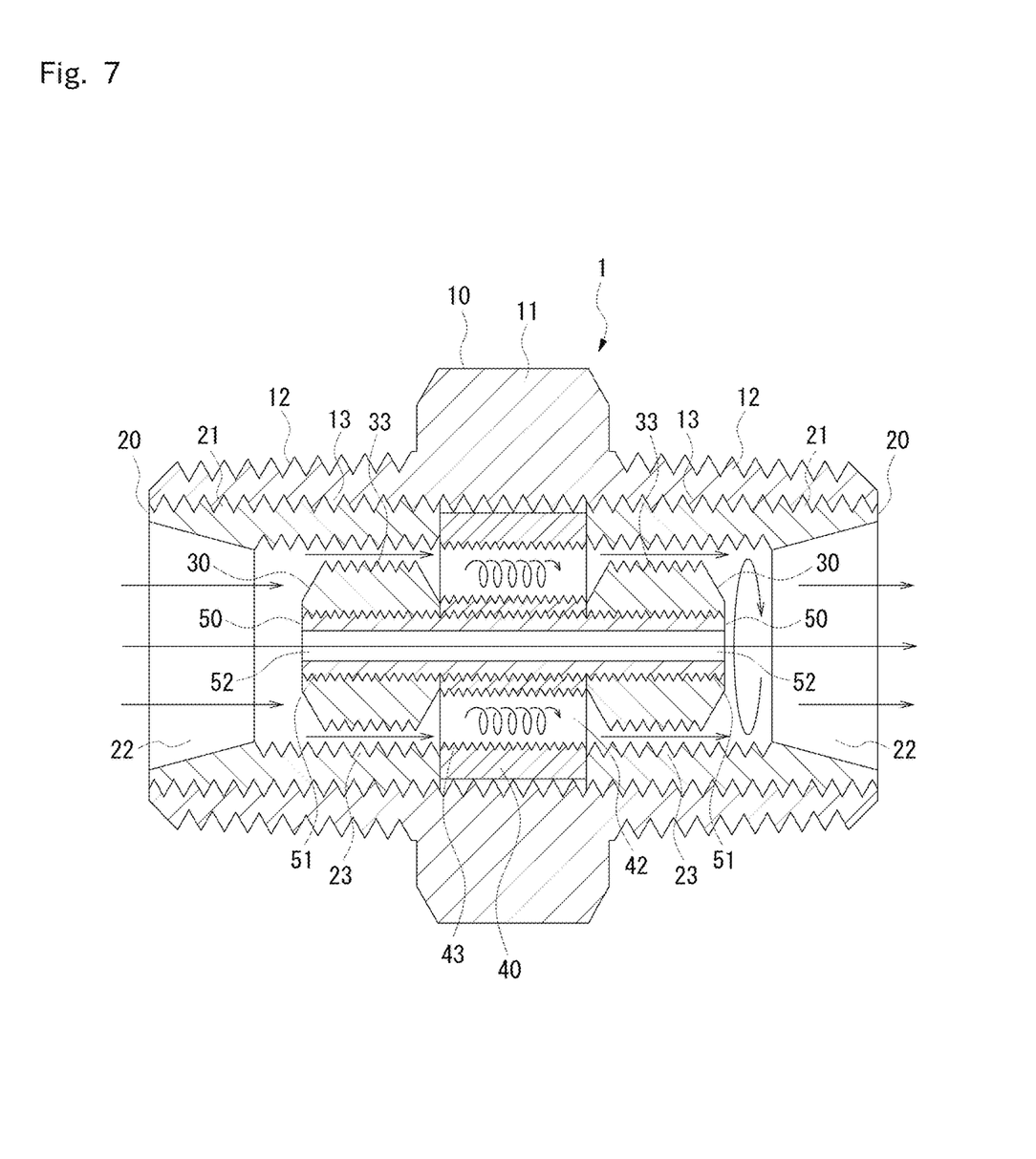
FIG. 7 is a side cross-sectional view of the fine bubble generator showing a liquid flowing therethrough.

Next, a mechanism of fine bubble generation by the fine bubble generator 1 according to this embodiment will be described with reference to FIG. 7.

First, the liquid flowing into the main unit case 10 at one axial end thereof is increased in flow velocity and pressure by the tapered part 22 of one outer member 20. After that, part of the liquid flows into the liquid passage hole 52 of the fixture member 50, and the other liquid flows into the gap between the inner surface of the one outer member 20 on one side in the axial direction and the outer surface of the inner member 30 on the one side in the axial direction. The liquid flowing in the gap between the outer member 20 and the inner member 30 is abruptly increased in flow velocity and pressure. When the liquid flows out of the gap between the outer member 20 and the inner member 30, cavitation occurs because of the decrease in pressure, and fine bubbles are generated in the liquid. Besides, the liquid flowing near the inner surface of the outer member 20 swirls along the first helical part 23, and the liquid flowing near the outer surface of the inner member 30 swirls along the second helical part 33.

The liquid having passed through the gap between the one outer member 20 and the inner member 30 on one side in the axial direction flows into the through-holes 42 of the middle member 40, and the liquid flows in the through-holes 42 while swirling along the third helical part 43.

The liquid having passed through the through-holes 42 then flows between the inner surface of the outer member 20 and the outer surface of the inner member 30 on the other side in the axial direction. When the liquid flows out of the gap between the outer member 20 and the inner member 30, cavitation occurs because of the decrease in pressure, and fine bubbles are generated in the liquid, as with the liquid flowing between the outer member 20 and the inner member 30 on the one side in the axial direction. In this process, the liquid flowing near the inner surface of the outer member 20 swirls along the first helical part 23, and the liquid flowing near the outer surface of the inner member 30 swirls along the second helical part 33.

After that, the liquid having passed through the gap between the outer member 20 and the inner member 30 on the other side in the axial direction merges with the liquid discharged from the liquid passage hole 52 of the fixture member 50, and flows to the outside at the other axial end of the main unit case 10. In this process, the liquid discharged from the liquid passage hole 52 is at the maximum flow velocity, while the liquid flowing out of the gap between the outer member 20 and the inner member 30 is decreased in flow velocity and pressure. Therefore, the difference in velocity and pressure between the liquid flowing out of the gap between the outer member 20 and the inner member 30 and the liquid discharged from the liquid passage hole 52 increases, and cavitation occurs at the boundary between these liquid flows, and fine bubbles are further generated. In addition, while the liquid discharged from the liquid passage hole 52 is a straight flow, the liquid flowing out of the gap between the outer member 20 and the inner member 30 is a swirl flow. Therefore, the cavitation is promoted by the mixing of these liquid flows.

Figure 8:
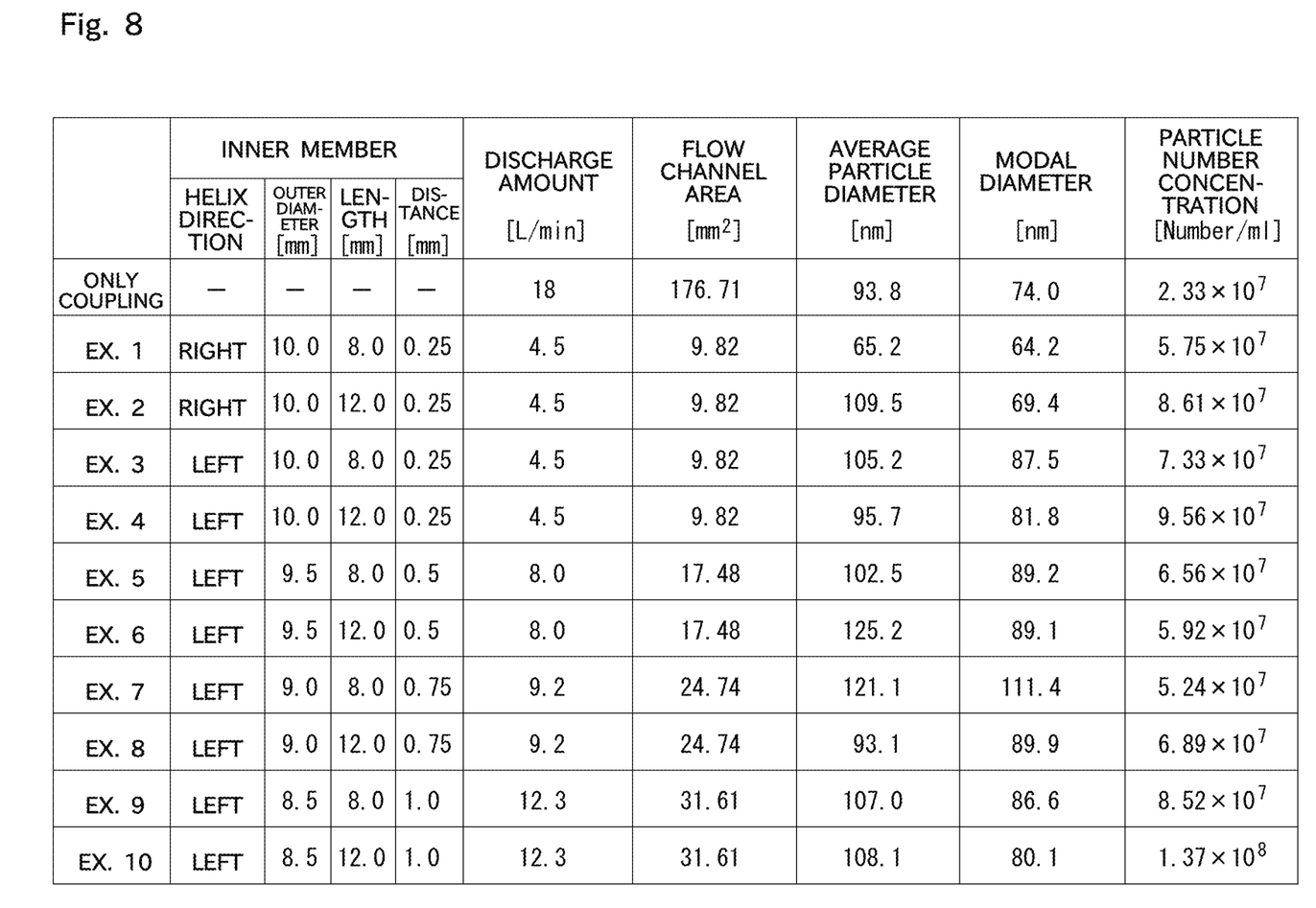
FIG. 8 is a table showing experiment results.

An experiment was performed using the fine bubble generator 1 according to this embodiment, and the results shown in FIG. 8 were obtained. The experiment was performed in examples 1 to 10 that differed in outer diameter D2 (outer diameter of the crest part 33a) of the second helical part 33 of the inner member 30, in length L of the inner member 30 and in helix direction of the second helical part 33 of the inner member 30, under the conditions that the inner diameter D1 (inner diameter of the crest part 23a) of the first helical part 23 of the outer member 20 shown in FIG. 2 was 10.5 mm, the pitch P1 of the first helical part 23 of the outer member 20 was 1.5 mm, the helix direction of the first helical part 23 of the outer member 20 was the right-hand helix, and the inner diameter D3 of the liquid passage hole 52 of the fixture member 50 was 1.5 mm.

In this case, in the example 1, the outer diameter D2 of the inner member 30 was 10.0 mm, the length L of the inner member 30 was 8 mm, and the helix direction of the second helical part 33 of the inner member 30 was the right-hand helix. In the example 2, the outer diameter D2 of the inner member 30 was 10.0 mm, the length L of the inner member 30 was 12 mm, and the helix direction of the second helical part 33 of the inner member 30 was the right-hand helix. In the example 3, the outer diameter D2 of the inner member 30 was 10.0 mm, the length L of the inner member 30 was 8 mm, and the helix direction of the second helical part 33 of the inner member 30 was the left-hand helix. In the example 4, the outer diameter D2 of the inner member 30 was 10.0 mm, the length L of the inner member 30 was 12 mm, and the helix direction of the second helical part 33 of the inner member 30 was the left-hand helix. In the example 5, the outer diameter D2 of the inner member 30 was 9.5 mm, the length L of the inner member 30 was 8 mm, and the helix direction of the second helical part 33 of the inner member 30 was the left-hand helix. In the example 6, the outer diameter D2 of the inner member 30 was 9.5 mm, the length L of the inner member 30 was 12 mm, and the helix direction of the second helical part 33 of the inner member 30 was the left-hand helix. In the example 7, the outer diameter D2 of the inner member 30 was 9.0 mm, the length L of the inner member 30 was 8 mm, and the helix direction of the second helical part 33 of the inner member 30 was the left-hand helix. In the example 8, the outer diameter D2 of the inner member 30 was 9.0 mm, the length L of the inner member 30 was 12 mm, and the helix direction of the second helical part 33 of the inner member 30 was the left-hand helix. In the example 9, the outer diameter D2 of the inner member 30 was 8.5 mm, the length L of the inner member 30 was 8 mm, and the helix direction of the second helical part 33 of the inner member 30 was the left-hand helix. In the example 10, the outer diameter D2 of the inner member 30 was 8.5 mm, the length L of the inner member 30 was 12 mm, and the helix direction of the second helical part 33 of the inner member 30 was the left-hand helix.

Note that a distance S between the first helical part 23 of the outer member 20 and the second helical part 33 of the inner member 30 (distance between the crest part 23a and the crest part 33a in the radial direction) was 0.25 mm when the outer diameter D2 of the inner member 30 was 10.0 mm, 0.5 mm when the outer diameter D2 of the inner member 30 was 9.5 mm, 0.75 mm when the outer diameter D2 of the inner member 30 was 9.0 mm, and 1.0 mm when the outer diameter D2 of the inner member 30 was 8.5 mm.

Figure 9:
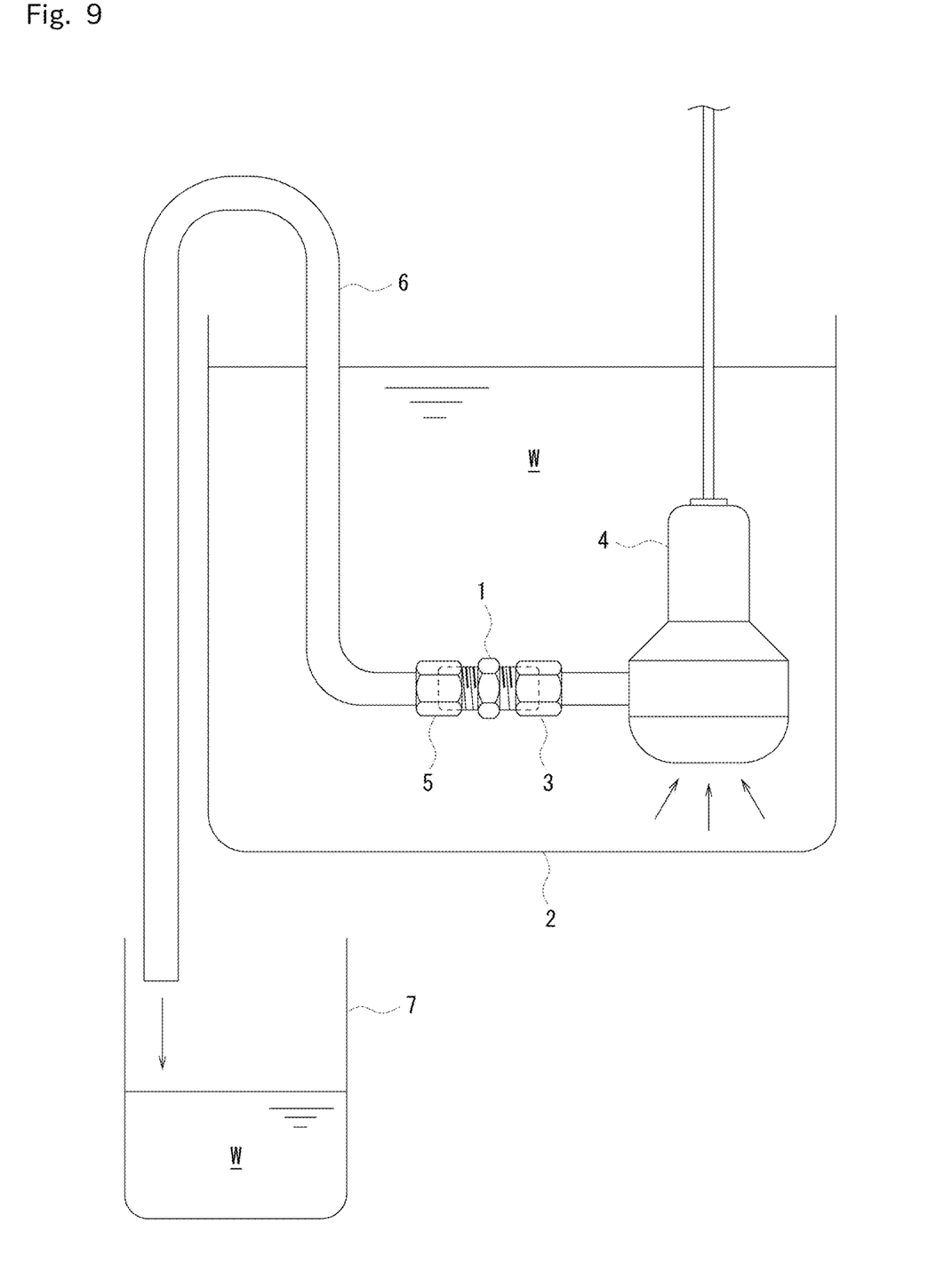
FIG. 9 is a schematic side view of an experiment device.

In this experiment, an experiment device was used in which a submersible pump 4 connected to one end of the fine bubble generator 1 by a coupling 3 was arranged in a first vessel 2 containing water W, and the water W was discharged into a second vessel 7 through a hose 6 connected to the other end of the fine bubble generator 1 by a coupling 5 as shown in FIG. 9.

In the experiment method, first, under the condition that the discharge pressure of the submersible pump 4 was 0.044 MPa, the discharge amount, the flow channel area, the average particle diameter, the modal diameter, and the particle number concentration was measured for a device without the fine bubble generator 1 connected thereto (the hose 6 is directly connected to the submersible pump 4 by the coupling). The particles measured were impurities in the water, and therefore, the particle number concentrations in the measurement results (results in the case where the fine bubble generator 1 was connected to the pump) listed below are numerical values obtained by subtracting the measurements in the case where only the coupling was used from the respective measurements.

Then, with the experiment device with the fine bubble generator 1 connected thereto, the water W sucked in by the submersible pump 4 was passed through the fine bubble generator 1, and bubbles contained in the water W collected in the second vessel 5 through the hose 6 were measured in the examples 1 to 10. In this measurement, the discharge amount and the flow channel area were measured, and the average particle diameter, the modal diameter and the particle number concentration were also measured in the particle tracking analysis method, which is known as a measurement method for the concentration distribution and diameter of ultra fine bubbles in water.

The experiment result showed that the average particle diameters and the modal diameters in all the examples 1 to 10 were less than 1 μm (ultra fine bubbles), and ultra fine bubbles were generated in all the examples 1 to 10. In addition, the particle number concentration was the highest in the example 10. In the example 10, the helix direction of the first helical part 23 was the right-hand helix, while the helix direction of the second helical part 33 was the left-hand helix. That is, the helix directions were the opposite directions, and therefore the swirling direction of the liquid flowing along the first helical part 23 and the swirling direction of the liquid flowing along the second helical part 33 were also the opposite directions, so that it can be considered that the cavitation was more effectively promoted than in the examples 1 and 2 in which the helix directions were the same direction. In addition, in the example 10, the length L of the inner member 30 was the longest, and the distance S between the first helical part 23 and the second helical part 33 was the greatest. Accordingly, the flow velocity decreased between the helical parts 23 and 33, and the difference in flow velocity and pressure between the liquid having passed through the gap between the helical parts 23 and 33 and the liquid discharged from the liquid passage hole 52 of the fixture member 50 increased, so that it can be considered that the cavitation was enhanced, and the amount of bubbles generated by the swirl flows was increased compared with the other examples 1 to 9. Furthermore, in the example 10, since the distance S between the first helical part 23 and the second helical part 33 was the greatest, not only the bubble generation amount but also the liquid discharge amount was the greatest.

As described above, according to this embodiment, the liquid flows in the gap between the first helical part 23 provided on the inner surface of the outer member 20 having a tubular shape and the second helical part 33 provided on the outer surface of the inner member 30 arranged in the outer member 20, so that when the liquid flows out of the gap between the first helical part 23 and the second helical part 33, cavitation occurs because of the decrease in pressure, and fine bubbles can be generated in the liquid flowing in the flow channel in the main unit case 10. In this process, the liquid flowing near the inner surface of the outer member 20 swirls along the first helical part 23, and the liquid flowing near the outer surface of the inner member 30 swirls along the second helical part 33, so that the cavitation can be promoted by the swirl flows, and the amount of fine bubbles generated can be increased. In this way, fine bubbles can be generated without introducing air by means of an external compressor or the like, so that the structure can be simplified, and the fine bubble generator can be widely used in domestic and industrial applications. Furthermore, unlike the case where gas is externally introduced, bubbles can be generated under high liquid pressure, so that the fine bubble generator can highly advantageously generate finer bubbles and increase the amount of bubbles generated.

Furthermore, since the pitch P1 of the first helical part 23 and the pitch P2 of the second helical part 33 in the axial direction are different from each other, the size of the gap between the helical parts 23 and 33 in any cross section perpendicular to the axial direction is uneven in the circumferential direction, so that cavitation more easily occurs compared with the case where the pitches are the same and the size of the gap is even in the circumferential direction, and the amount of fine bubbles generated can be increased.

Furthermore, the tapered part 22 is provided at the liquid inlet so that the inner diameter of the outer member 20 gradually decreases toward the downstream side. The tapered part 22 can increase the flow velocity and pressure of the liquid before flowing into the gap between the first helical part 23 and the second helical part 33, thereby enhancing the cavitation effect.

Furthermore, since the first helical part 23 and the second helical part 33 are formed so that the helix directions thereof are the opposite directions, the flow near the first helical part 23 and the flow near the second helical part 33 are swirl flows in the opposite directions. Therefore, cavitation more easily occurs and the amount of fine bubbles generated can be increased, compared with the case where the helix directions of the helical parts are the same.

Furthermore, since the liquid passage hole 52 penetrating the radially central part of the inner member 30 in the axial direction is provided, a straight flow having a greater flow velocity than the swirl flow flowing out of the gap between the outer member 20 and the inner member 30 can be discharged from the liquid passage hole 52 to the center of the swirl flow. The cavitation can be promoted by the mixing of the swirl flow and the straight flow that significantly differ in velocity and pressure.

Furthermore, a pair of outer members 20 are provided in the axial direction in the main unit case 10, a pair of inner members 30 are provided in the axial direction in the main unit case 10, and the middle member 40 that allows the liquid to flow therethrough in the axial direction is provided between the outer member 20 and the inner member 30 on one side in the axial direction and the outer member 20 and the inner member 30 on the other side in the axial direction. And the outer members 20, the inner members 30 and the middle member 40 are assembled to the main unit case 10 by screwing the outer threaded parts 21 of the outer members 20 into the inner threaded part 13 of the main unit case 10 in the state where the middle member 40 supports the inner members 30, and the middle member 40 is held between the outer members 20 in the axial direction. Therefore, the fine bubble generator can be assembled without using welding or a separate part, such as a bolt or a nut, and can be highly easily manufactured. Furthermore, the fine bubble generator can be totally assembled only by fastening the members in the main unit case 10, the main unit case 10 can be made of a single member having no seam or hole and can have improved hermeticity and durability against water pressure.

Furthermore, since the plurality of through-holes 42 that allow the liquid to flow therethrough in the axial direction are provided in the middle member 40 at intervals in the circumferential direction, and the third helical part 43 helically extending in the circumferential direction is provided on the inner surface of each through-hole 42, the liquid in each through-hole 42 can flow while swirling along the third helical part 43, and the swirling can promote generation of finer bubbles in the liquid.

The embodiment described above is just an example of the present invention, and the present invention is not limited to the embodiment described above.

REFERENCE SIGNS LIST 1 fine bubble generator
10 main unit case
11 hexagonal nut part
20 outer member
21 outer threaded part
22 tapered part
23 first helical part
30 inner member
33 second helical part
40 middle member
42 through-hole
43 third helical part
50 fixture member
P1, P2 pitch

The invention claimed is:

1. A fine bubble generator that is provided in a flow channel in which a liquid flows and generates a bubble in the liquid flowing in the flow channel, comprising:
   a pair of outer members disposed in an axial direction and having a tubular shape in which the liquid flows in the axial direction, a first helical part helically extending in a circumferential direction being formed on an inner surface of the outer member;
   a pair of inner members disposed in the axial direction and arranged in the outer member with an outer surface thereof facing the inner surface of the outer member at a predetermined distance, a second helical part helically extending in the circumferential direction being formed on the outer surface of the inner member; and
   a middle member that is arranged between the outer member and inner member on one side in the axial direction and the outer member and inner member on another side in the axial direction, supports the inner members, and have a through-hole that allows the liquid to pass therethrough in the axial direction,
   wherein a liquid passage hole is provided that penetrates radially central parts of the inner members and the middle member from a liquid inlets side of the inner member on the one side to a liquid outlet side of the inner member on the another side in the axial direction, and
   the liquid flows between the first helical part of the outer member on the one side and the second helical part of the inner member on the one side and through the liquid passage hole, and the liquid having passed through between the outer member on the one side and the inner member on the one side passes through a through-hole in the middle member, flows between the first helical part of the outer member on the another side and the second helical part of the inner member on the another side, and is merged with the liquid having passed through the liquid passage hole on the liquid outlet side of the inner member on the another side.

2. The fine bubble generator according to claim 1, wherein the first helical part and the second helical part have different pitches in the axial direction.

3. The fine bubble generator according to claim 1, wherein the outer member has a tapered part on a liquid inlet side so that an inner diameter of the outer member decreases toward a downstream side.

4. The fine bubble generator according to claim 1, wherein helix directions of the first helical part and the second helical part are opposite to each other.

5. The fine bubble generator according to claim 1, further comprising:
   a fixture member that extends from the radially central part of the middle member in the axial direction,
   wherein the fixture member supports the inner members, and
   the liquid passage hole is provided in the fixture member.

6. The fine bubble generator according to claim 1, further comprising:
   a main unit case having a tubular shape with openings at both axial ends thereof, an inner threaded part being provided on an inner surface of the main unit case,
   wherein the outer members, the inner members and the middle member are assembled to the main unit case by screwing an outer threaded part provided on an outer surface of each outer member into an inner threaded part provided on the inner surface of the main unit case and holding the middle member between the outer members in the axial direction in a state where the middle member supporting the inner members is held arranged between the outer members.

7. The fine bubble generator according to claim 1, wherein a plurality of the through-holes are provided in the middle member at intervals-a plurality of sites in the circumferential direction, and
   a third helical part helically extending in the circumferential direction is provided on an inner surface of each through-hole.

* * * * *